US009168606B2

(12) United States Patent
Lin et al.

(10) Patent No.: US 9,168,606 B2
(45) Date of Patent: Oct. 27, 2015

(54) ELECTROSPARK DEPOSITION PROCESS AND SYSTEM FOR REPAIR OF GAS TURBINE

(75) Inventors: Dechao Lin, Greer, SC (US); John Gregory Obeirne, Greenville, SC (US); David Vincent Bucci, Simpsonville, SC (US); Srikanth Chandrudu Kottilingam, Simpsonville, SC (US); Yan Cui, Greer, SC (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 13/471,617

(22) Filed: May 15, 2012

(65) Prior Publication Data

US 2013/0309418 A1 Nov. 21, 2013

(51) Int. Cl.
*B23K 9/04* (2006.01)
*B23K 9/16* (2006.01)

(52) U.S. Cl.
CPC . *B23K 9/04* (2013.01); *B23K 9/164* (2013.01); *B23K 2201/001* (2013.01)

(58) Field of Classification Search
CPC .................................. B23K 9/04; B23K 9/164
USPC ............... 427/140, 142, 580, 540; 219/76.13, 219/137.62
See application file for complete search history.

(56) References Cited

U.S. PATENT DOCUMENTS

| 6,417,477 | B1 * | 7/2002 | Brown et al. | 219/76.13 |
| 2007/0231589 | A1 * | 10/2007 | Smeggil et al. | 428/469 |

OTHER PUBLICATIONS

Frangini et al, A study on the effect of a dynamic contact force control for imprinving electrospark coating properties, Feb. 2010, Surface & Coating Technology, 204, p. 2613-2623.*
J. Gould, Application of Electro-Spark Deposition as a Joining Technology, Welding Journal, Oct. 11, vol. 90, pp. 191-197, Columbus, OH.
Denise M. Aylor, Electrospark Deposition for U.S. Navy Components Repair Applications, Jan. 2006, HCAT Meeting, San Diego, CA, NSWC Carderock Division, West Bethesda, MD.
Norma Price, Electrospark Deposition Studies for Gas Turbine Engine Component Repair, Advanced Surfaces and Processes, Inc., HCAT Program Review Meeting, Grandover Resort and Conference Center, Greensboro, NC, Mar. 17, 2005.
M.J. Lambert, Summary of Dissimilar Metal Joining Trials Conducted by Edison Welding Institute, Bechtel Bettis, Inc., West Mifflin, PA, Materials Technology Information Brief, Nov. 18, 2005.
Shoju Aoshima, Electro-Spark Process for Repair and Maintenance of Die Casting Dies, TechnoCoat International, Japan, URL:technocoat.co.jp, Printed on May 2012.
Norma Price, Results of Materials Testing for Electrospark Deposition, Advanced Surfaces and Processes, Inc., HCAT Program Review Meeting, Hilton San Diego Resort, San Diego, CA, Jan. 26, 2006.
Plasma Jet, Electro-Spark Deposition (ESD) Process, copyright 2008 Plasma Jet, Printed on May 2012.

* cited by examiner

*Primary Examiner* — Dah-Wei D Yuan
*Assistant Examiner* — Ngaleung V Law
(74) *Attorney, Agent, or Firm* — McNees Wallace & Nurick LLC

(57) ABSTRACT

A system and method for repairing a metal substrate includes an electrospark device and an electrode removably supported in the electrode holder. The electrospark device applies a coating of a material when placed into contact with the metal substrate. A cooling device to lowers the temperature of shielding gas flow below an ambient temperature. A conduit is arranged to direct a flow of the shielding gas to the interface of the electrode and the substrate to cool the area of the substrate receiving the coating.

11 Claims, 3 Drawing Sheets

ELECTROSPARK DEPOSITION PROCESS AND SYSTEM FOR REPAIR OF GAS TURBINE

BACKGROUND

The application generally relates to the repair of gas turbine components. The application relates more specifically to the use of an electrospark deposition process to repair a gas turbine primary fuel nozzle.

Gas turbine engines include fuel nozzles to deliver combustion fuel to combustor components. Over a period of extended use, fuel nozzles may experience deterioration, e.g, around the edges of the nozzle tip. There is currently no efficient process available to repair a primary fuel nozzle that is manufactured with a brazed joint between the nozzle tip and the body of the nozzle. Any process to build a metal layer by traditional fusion welding poses a risk that the brazed joint may be damaged by the heat applied by the welding process. Also, distortion induced by the welding process may not be acceptable for the tolerances required of turbine components such as a primary fuel nozzle. In order to avoid the risks associated with fusion welding, a process with a low heat input has to be used. Laser cladding may be sufficiently low temperature for restoring a nozzle tip to the correct dimensions, but depositing metal on the edge of a nozzle using laser cladding techniques is difficult.

An electrospark deposition (ESD) process is known to have a very low heat input. The ESD transfers stored energy to a consumable electrode, e.g., carbides (W, Ti, Cr etc) stainless steel, aluminum, and other electrode compositions. The temperature on the tip of the electrode may be in a range of about 5000 to about 10,000° C. The electrode material is ionized and transferred to the substrate surface, producing an alloy with the substrate and a deposition on the alloyed electrode-substrate interface. The deposited layer bonds metallurgically on the alloyed substrate and electrode material.

ESD is used for cosmetic repair of gas turbine components. One challenge that the ESD process must overcome is overheating of the electrode and the local substrate, e.g., in a fuel nozzle, where a brazed joint may be compromised by local heating caused by welding or ESD techniques. What is needed is a local cooling process that provides ESD on a fuel nozzle without overheating the electrode and local substrate.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment the disclosure relates to a method of repairing a metal substrate includes the steps of providing a substrate; providing an electrospark deposition device with a consumable electrode; providing a shielding gas; cooling the shielding gas to lower the temperature of the gas below an ambient temperature; establishing a continuous spark between the electrode and the substrate; directing a flow of the shielding gas at an interface of the electrode, the substrate and the spark; and depositing an alloyed coating until a desired coating thickness is obtained.

Another embodiment relates to a system for repairing a metal substrate includes an electrospark device and an electrode removably supported in the electrode holder. The electrospark device applies a coating of a material when placed into contact with the metal substrate. A cooling device to lower the temperature of shielding gas flow below an ambient temperature. A conduit is arranged to direct a flow of the shielding gas at an interface of the electrode and the substrate to cool the area of the substrate receiving the coating.

The present disclosure describes a method for repairing a primary fuel gas nozzle tip with a very low heat input that will not impair a nearby brazed joint. Current technology in the ESD process uses a shielding gas to cool the electrode only, to prevent oxidation. In the present disclosure, a cooled shielding gas of argon or nitrogen is applied to both the electrode and the area of the substrate in contact with the electrode.

Another advantage is that the disclosed ESD process may be operated continuously as long as is necessary to deposit a required coating thickness.

Still another advantage is the low temperature of the electrode and substrate, as the measured temperature on the electrode is less than 200° F.

Yet another advantage is the ability to provide a coating thickness of between 2 and 10 mils, which is sufficient to salvage some gas nozzles. Also, a thicker coating of ESD may be deposited if needed.

Alternative exemplary embodiments relate to other features and combinations of features as may be generally recited in the claims.

DETAILED DESCRIPTION OF THE EXEMPLARY EMBODIMENTS

Figure 1:
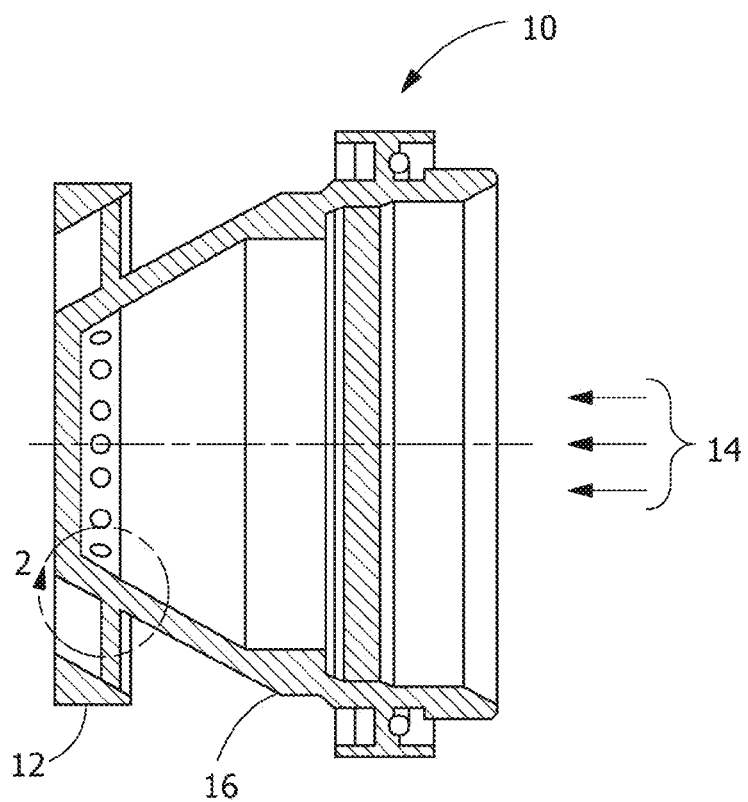
FIG. 1 shows an exemplary fuel nozzle for a gas turbine engine.
Figure 2:
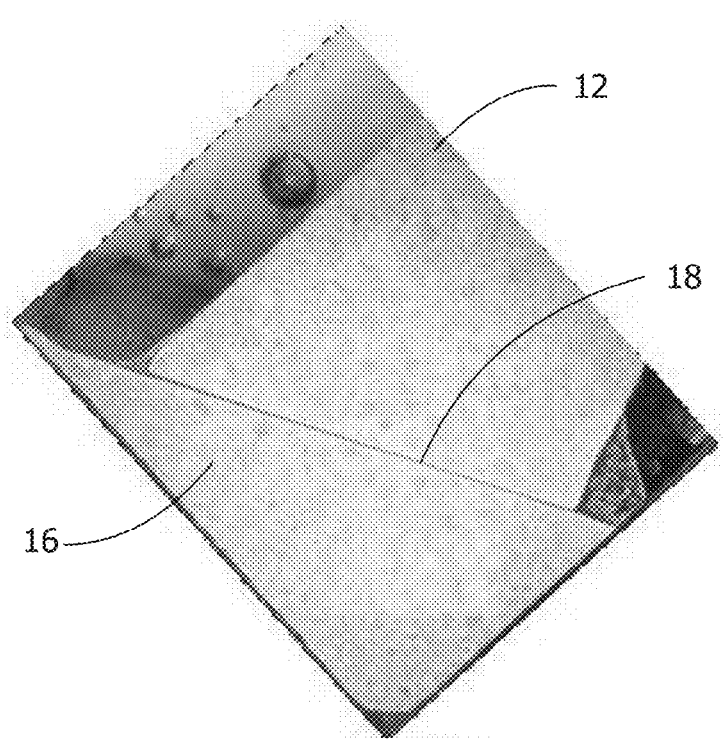
FIG. 2 shows a partial cross-sectional view of a brazed joint between a fuel nozzle tip and a body of the fuel nozzle.

Referring to FIGS. 1 and 2, a fuel nozzle 10 includes a nozzle tip 12 in fluid communication with a nozzle body 16 and a fuel gas flow 14 therethrough. Nozzle tip 12 is connected to nozzle body 16 by a brazed joint 18 (FIG. 2).

Figure 3:
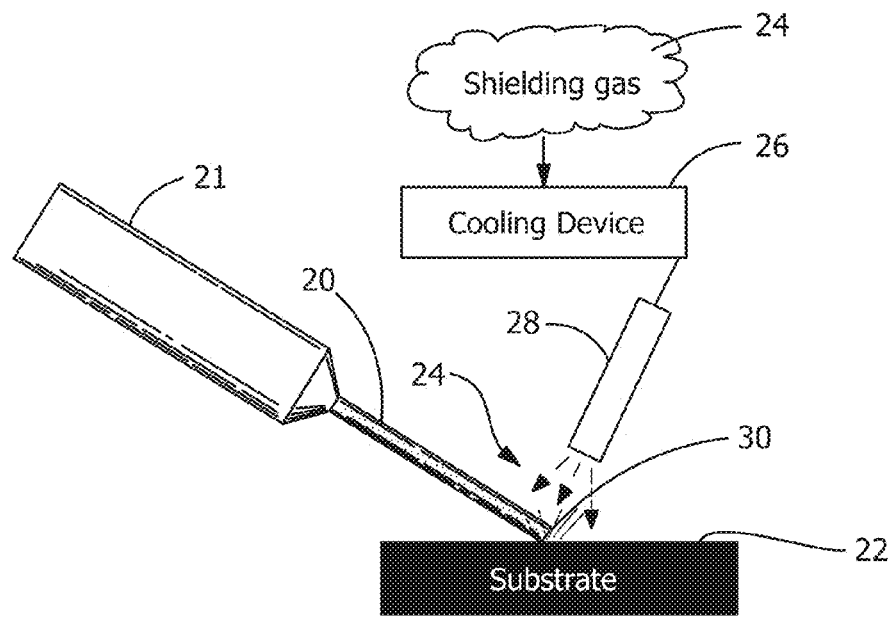
FIG. 3 shows an exemplary cooling apparatus for ESD and substrate.

Referring next to FIG. 3, an electrospark deposition (ESD) process is shown. The ESD provides a suitable thickness of electrode material to repair the substrate, e.g., a fuel nozzle tip 12 (FIG. 1). An electrospark device 21 supports and drives a consumable electrode 20. Electrode 20 is placed into contact with a metal substrate 22, which in this example schematically represents the nozzle tip 12. Electrode 20 is composed of material suitable for forming a metallurgical bond with substrate 22. A shielding gas flow 24 is first introduced to a cooling device 26 to lower the temperature of the shielding gas flow 24 below the ambient temperature. Cooling devices for shielding gases, e.g., argon, nitrogen, or helium, are known to those skilled in the art. Electrode 20 and surrounding substrate 22 of the work piece 12 are cooled by shielding gas 24 passing from cooling device 26 through a supply conduit 28. Supply conduit 28 directs a flow of shielding gas 24 to the interface 30 of electrode 20 and substrate 22.

Gas fuel nozzle tip 12 is mounted in a rotatable positioner having a rotary speed adjustment. The ESD electrode 20 is secured to nozzle tip 12 with an applied torque to establish a continuous spark between electrode 20 and substrate 12, 22 to be repaired. The rotational speed of the ESD electrode may be adjustable as well. Cooled shielding gas 24 is then supplied to the interface 30 of electrode 20 and substrate 12, 22. Shielding gas 24 cools both the substrate 12, 22 surface and the electrode tip in the area of the electrospark. The reduced process temperature allows the coating process to operate continuously until a desired coating thickness is achieved. In one embodiment the temperature of the electrode tip and the area surrounding the electrode tip during the ESD process may be reduced to less than 200° F. In one embodiment a coating thickness ranging between 2 and 10 mils is applied. A thickness of about 2 to 10 mils is sufficient to salvage some worn gas nozzles. In another embodiment a thicker coating of ESD may be deposited if needed.

Figure 4:
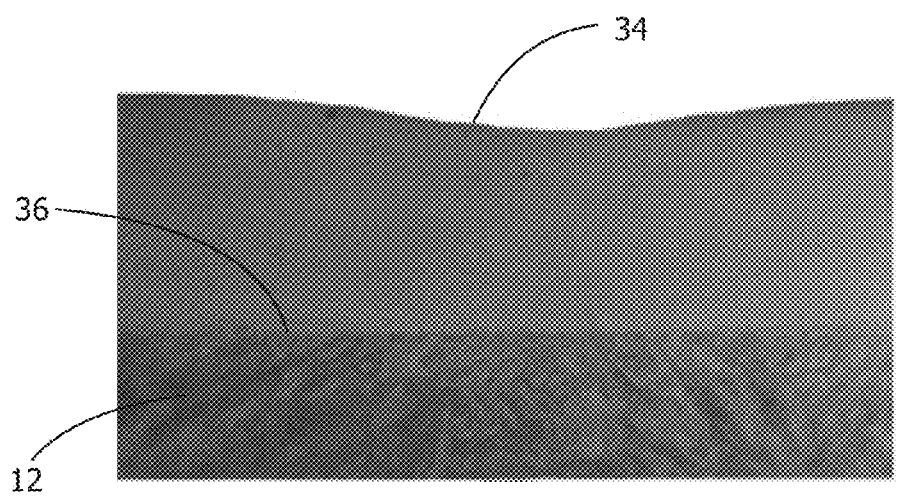
FIG. 4 shows a magnified cross-sectional view of an exemplary repaired nozzle tip.

Referring next to FIG. 4, a magnified cross-section of a repaired nozzle tip 12 shows a fusion bonded interface 36 between the ESD coating 34 and nozzle tip 12. The nozzle tip 12 was repaired using the ESD coating process described above. The brazed joint 18 is undamaged following the ESD coating process.

Figure 5:
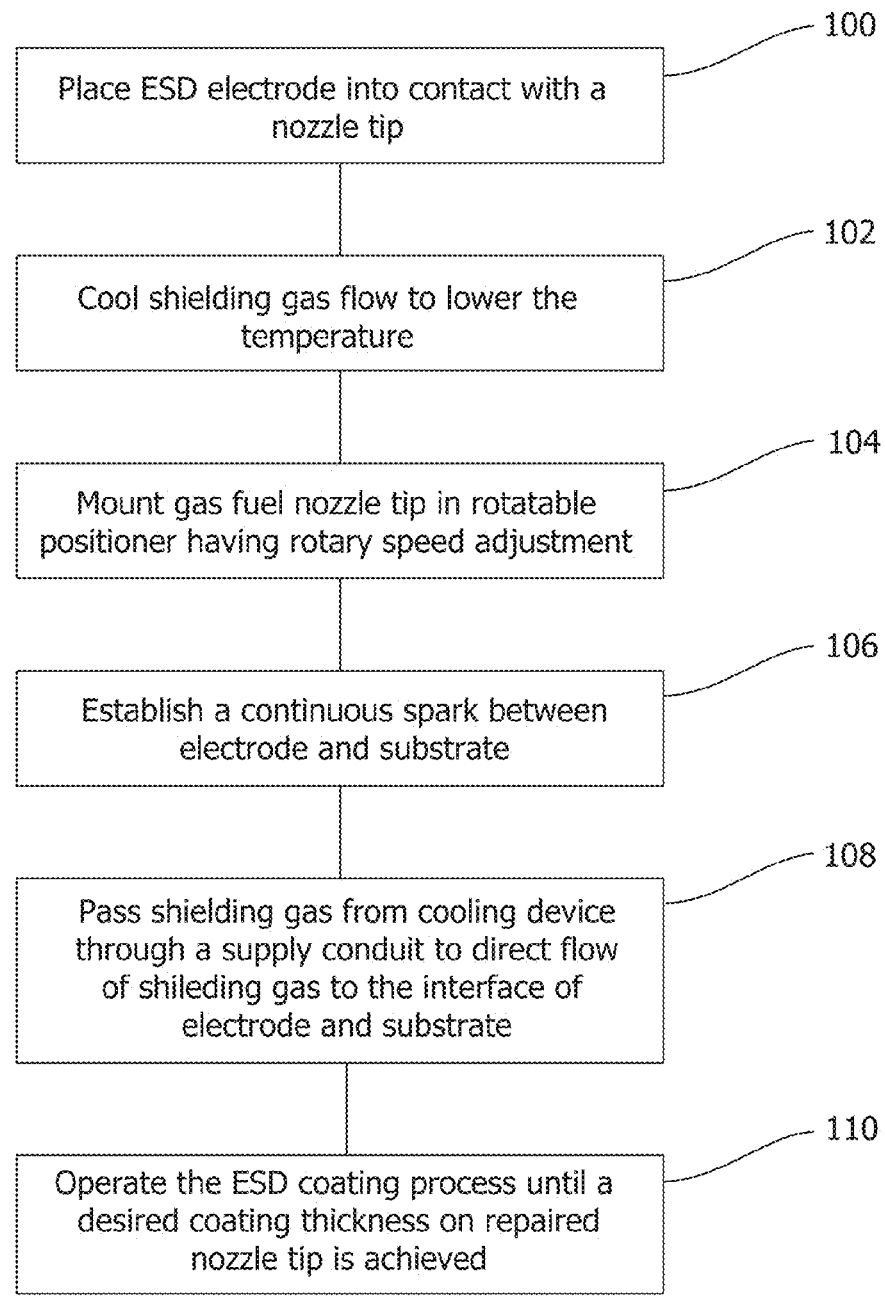
FIG. 5 shows a process view of an electropark deposition method, according to an embodiment of the disclosure.

Referring next to FIG. 5, a flow chart is provided to describe the method of the present disclosure. At step 100, the method begins by placing an ESD electrode into contact with a nozzle tip. At step 102, the method proceeds to cool the shielding gas flow to lower the temperature of the gas. Next, at step 104, the gas fuel nozzle tip is mounted in rotatable positioner having rotary speed adjustment. At step 106, the method proceeds to establish a continuous spark between the ESD electrode and the substrate of the nozzle tip. Next at step 108 the method proceeds by passing cooled shielding gas through a supply conduit to direct flow of shielding gas at the interface of electrode and substrate. Finally, at step 110, the method continues by operating the ESD coating process until a desired coating thickness is applied over the surface of the nozzle tip.

It should be understood that the application is not limited to the details or methodology set forth in the following description or illustrated in the figures. It should also be understood that the phraseology and terminology employed herein is for the purpose of description only and should not be regarded as limiting.

It is important to note that the construction and arrangement of the ESD system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A method of repairing a metal substrate comprising:
providing a substrate;
providing an electrospark deposition device, the electrospark deposition device configured to hold a consumable electrode with adjustable rotary speed;
providing a shielding gas;
cooling the shielding gas to lower the temperature of the gas below an ambient temperature;
establishing a continuous spark between the electrode and the substrate;
directing a flow of the shielding gas to the interface of the electrode, the substrate and the continuous spark; and
continuously depositing an alloyed coating until a desired coating thickness is obtained:
wherein the flow of the shielding gas cools the consumable electrode and the substrate.

2. The method of claim 1, further comprising the step of continuously operating the electrospark deposition coating process until a desired coating thickness is applied over the surface of substrate.

3. The method of claim 1, further comprising adjusting a rotational speed of the substrate relative to the electrode.

4. The method of claim 3, further comprising adjusting a rotational speed of the electrode relative to the substrate.

5. The method of claim 1, further comprising rotatably mounting the substrate in a positioner.

6. The method of claim 1, further comprising repeating the previous step of depositing an alloyed coating until a desired coating thickness is obtained.

7. The method of claim 1, further comprising forming a metallurgical bond between the substrate and the alloyed coating on a surface of the substrate.

8. The method of claim 3, wherein the rotary electrode comprises an electrode material suitable for forming a metallurgical bond with the substrate.

9. The method of claim 1, wherein the step of cooling the shielding gas further comprises introducing the shielding gas into a cooling device.

10. The method of claim 1, wherein the step of depositing an alloyed coating further comprises depositing an alloyed coating with the electrospark deposition device adjacent to a brazed joint on the substrate without thermally damaging the brazed joint.

11. The method of claim 1, wherein the establishing the continuous spark between the electrode and the substrate further comprises securing the electrode to the substrate under an applied torque to secure a direct contact between the electrode and the substrate.

* * * * *